United States Patent
Matsumoto

(10) Patent No.: US 9,812,085 B2
(45) Date of Patent: Nov. 7, 2017

(54) IMAGE DISPLAY DEVICE

(71) Applicant: SAMSUNG DISPLAY CO., LTD., Yongin, Gyeonggi-Do (KR)

(72) Inventor: Kazuhiro Matsumoto, Yokohama (JP)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 708 days.

(21) Appl. No.: 14/281,102

(22) Filed: May 19, 2014

(65) Prior Publication Data

US 2014/0340418 A1    Nov. 20, 2014

(30) Foreign Application Priority Data

May 20, 2013    (JP) ................................. 2013-106554

(51) Int. Cl.
    *G09G 5/04*    (2006.01)
    *G09G 5/02*    (2006.01)
    *H04N 9/67*    (2006.01)
    *H04N 1/60*    (2006.01)

(52) U.S. Cl.
    CPC .............. *G09G 5/02* (2013.01); *H04N 1/6061* (2013.01); *H04N 9/67* (2013.01); *G09G 2340/06* (2013.01)

(58) Field of Classification Search
    CPC ........ H04N 1/6058; G09G 5/02; G09G 5/346; G09G 2320/0666; G09G 2360/16
    See application file for complete search history.

(56) References Cited

U.S. PATENT DOCUMENTS

| 8,194,095 B2 | 6/2012 | Imai et al. |
| 2009/0278982 A1 | 11/2009 | Imai et al. |
| 2010/0020242 A1 | 1/2010 | Lammers et al. |

FOREIGN PATENT DOCUMENTS

| JP | 2003-153027 | | 5/2003 |
| JP | 2006-005543 | | 1/2006 |
| JP | 2006-014322 | | 1/2006 |
| JP | 2006-211369 | A | 8/2006 |
| JP | 2009-117951 | A | 5/2009 |
| JP | 2009-130841 | A | 6/2009 |
| JP | 2009-139959 | A | 6/2009 |
| JP | 2009-218963 | | 9/2009 |
| JP | 2010-183232 | A | 8/2010 |
| JP | 2010-245709 | | 10/2010 |
| JP | 2011-142386 | A | 7/2011 |
| JP | 2011-188319 | A | 9/2011 |

*Primary Examiner* — Todd Buttram
(74) *Attorney, Agent, or Firm* — Lee & Morse, P.C.

(57) ABSTRACT

A gamut adjusting method fully expresses a dynamic range of a display gamut to display an image more naturally. With respect to a brightness signal of each primary color of an input image signal, a data translation unit executes a matrix calculation based on a translation matrix for conversion into an image signal for display control. A saturation calculating unit calculates saturation of the input image signal. When saturation is smaller than a threshold value, the data translation unit is set with a translation matrix such that a tone on the display corresponds to or approximates a tone of the input image signal. When saturation is greater than the threshold value and smaller than a maximum value, as the saturation increases, a translation matrix is switched such that a vector on a xy chromaticity diagram toward a tone on a display approximates a vector toward a tone for maximum saturation.

20 Claims, 15 Drawing Sheets

IMAGE DISPLAY DEVICE

CROSS-REFERENCE TO RELATED APPLICATION

Japanese Patent Application No. 2013-106554, filed on May 20, 2013, and entitled, "Image Display Device," is incorporated by reference herein in its entirety.

BACKGROUND

1. Field

One or more embodiments described herein relate to an image display device.

2. Description of the Related Art

Each image display device (or display) may have a unique gamut. The gamut may or may not correspond to standardized gamut (e.g., sRGB or NTSC) input image signal (source). Also, hues and saturations of colors may vary, and limits of saturation may differ for different display devices. Consequently, inaccuracies may develop when attempting to display an image.

FIG. 1 illustrates an example of a chromaticity diagram of an XYZ color system which includes a display gamut (GMTD) and a source gamut (GMTS). The source gamut is a gamut standardized according to sRGB or NTSC.

In general, it is possible to quadrate locations of white colors of the display gamut and source gamut (sRGB). Locations of chromatic colors may not be quadrated due to a gamut difference between the display gamut and source gamut (sRGB). In FIG. 1, as saturation increases, the display gamut deviates to a long wavelength side (a direction with a small angle in a saturation circle), compared to source gamut (sRGB).

As a result, blue and green colors BD and GD of the display gamut exist outside the source gamut. Also, blue and green colors BS and GS of the source gamut exist outside of display gamut. Also, a red color RD of the display gamut exists outside the source gamut, but a red color RS of the source gamut exists inside the display gamut.

In this case, a display may only express color in the display gamut. Because only colors in the display gamut are expressed, a color of a hue corresponding to a location of GS or BS may not be expressed. If an input image signal distributed in the source gamut (sRGB) is used to control a display panel without modification, a color of a tone corresponding to a primary location of RS may be expressed as a color of a tone corresponding to a location of RD.

SUMMARY

In accordance with one embodiment, a gamut adjusting method includes calculating a saturation of an input image signal; setting a translation matrix for translating the input image signal; and executing a matrix calculation for the input image signal based on the translation matrix, wherein setting the translation matrix includes: setting a unit matrix as the translation matrix when a value of the saturation below a threshold value, rotating the saturation in proportion to an increase in the saturation when the saturation value is greater than the threshold value and smaller than the maximum value, and switching the translation matrix to correspond to or approximate a maximum saturation expressed on a display, wherein a one on the display corresponds to or approximates a tone of the input image signal when a value of the saturation is smaller than the threshold value.

The method may include defining a virtual gamut corresponding to a start translation matrix (MSTART) and an end translation matrix (MEND) for each of a plurality of divided hue areas, wherein the virtual gamut is defined such that a complementary color in one of the hue areas uses a tone defined as a same chromaticity coordinate as the MSTART and MEND and an adjacent one of the hue areas uses a same complementary tone. The divided hue areas may correspond to a hue area divided by a predetermined angle. The predetermined angle may be 60°. The matrix calculation may be executed with respect to a brightness signal of each of a plurality of primary colors of the input image signal.

In accordance with another embodiment, an image display device includes a saturation calculating circuit to calculate a saturation of an input image signal; a matrix generating circuit to set a translation matrix for translating the input image signal; and a matrix calculating circuit to execute a matrix calculation for the input image signal based on the translation matrix set by the matrix generating circuit and to provide a result to the display panel, wherein the matrix generating circuit is to: set a unit matrix as the translation matrix when a value of the saturation is below a threshold value, rotate the saturation in proportion to an increase in the saturation when the saturation value is greater than the threshold value and smaller than the maximum value, and switch the translation matrix to correspond to or approximate a maximum saturation expressed on a display for maximum saturation, wherein a one on the display corresponds to or approximates a tone of the input image signal when a value of the saturation is smaller than the threshold value.

The matrix generating circuit may generate and set the translation matrix by performing linear interpolation up to the translation matrix when the saturation value is greater than the threshold value and smaller than the maximum value, and set the translation matrix to the unit matrix when the saturation value is less than the threshold value.

The matrix generating circuit may, when the saturation value is greater than the threshold value and smaller than the maximum value, set the translation matrix calculated by:

$$M\text{START}+(S-PL)\cdot M\text{STEP},$$

where $M\text{DIFF}=M\text{END}-M\text{START}$ and $$M\text{STEP}=M\text{DIFF}/(S\text{MAX}-PL)$$

where MSTART is a translation matrix set when the saturation value is less than a predetermined threshold value, MEND is a translation matrix set when the saturation value is a maximum value, SMAX is a maximum saturation value, and PL is a threshold value corresponding to a saturation reference. The device may include a memory to store MSTART and MSTEP.

The device may include a hue area determining unit to determine whether a hue of the input image signal belongs to any of a plurality of hue areas on a divided saturation circle, wherein the memory is to store the PL, MSTART, and MSTEP decided for each of the hue areas, and wherein the matrix generating circuit is to decide the translation matrix based on the PL, MSTART, and MSTEP decided with respect to one of the hue areas determined by the hue area determining unit and corresponding to saturation of the input image signal:

The translation matrix may be decided using the PL, MSTART, and MSTEP calculated from a virtual gamut defined to correspond to MSTART and MEND at each of the hue areas. The matrix calculating circuit may execute the matrix calculation with respect to a brightness signal of each of a plurality of primary colors of the input image signal.

In accordance with another embodiment, a gamut adjusting circuit includes a saturation calculating unit to calculate a saturation of an input image signal; a matrix generating unit to set a translation matrix for translating the input image signal; and a data translation unit to execute a matrix calculation for the input image signal based on the translation matrix set by the matrix generating unit and to provide a result to a display panel, wherein the matrix generating unit is to: set a unit matrix as the translation matrix when a value of the saturation is a maximum value, rotate the saturation in proportion to an increase in the saturation when the saturation value is greater than a threshold value and smaller than the maximum value, and switch the translation matrix to correspond to or approximate a maximum saturation expressed on a display for maximum saturation, wherein a one on the display corresponds to or approximates a tone of the input image signal when a value of the saturation is smaller than the threshold value.

In accordance with another embodiment, a gamut adjusting method includes calculating saturation of an input image signal; and executing a matrix calculation based on a translation matrix to convert an input image signal into an image signal for display, the matrix calculation including: setting a translation matrix such that a tone on a display corresponds to or approximates a tone of the input image signal, when a value of the saturation is smaller than a threshold value, and switching the translation matrix when a value of the saturation is greater than the threshold value and smaller than a maximum value, the translation matrix switched as the saturation increases such that a vector on a xy chromaticity diagram toward a tone on a display approximates to a vector toward a tone for maximum saturation.

The matrix calculation may be executed with respect to a brightness signal of each of a plurality of primary colors of the input image signal.

The method may include defining a virtual gamut corresponding to a start translation matrix (MSTART) and an end translation matrix (MEND) for each of a plurality of divided hue areas, wherein the virtual gamut is defined such that a complementary color in one of the hue areas uses a tone defined as a same chromaticity coordinate as the MSTART and MEND and an adjacent one of the hue areas uses a same complementary tone. The divided hue areas may correspond to a hue area divided by a predetermined angle. The predetermined angle may be 60°.

The method may include adjusting the threshold value to prevent clipping. Also, a one on the display may correspond to or approximates a tone of the input image signal when a value of the saturation is smaller than the threshold value.

BRIEF DESCRIPTION OF THE FIGURES

Features will become apparent to those of skill in the art by describing in detail exemplary embodiments with reference to the attached drawings in which.

DETAILED DESCRIPTION

Figure 1:
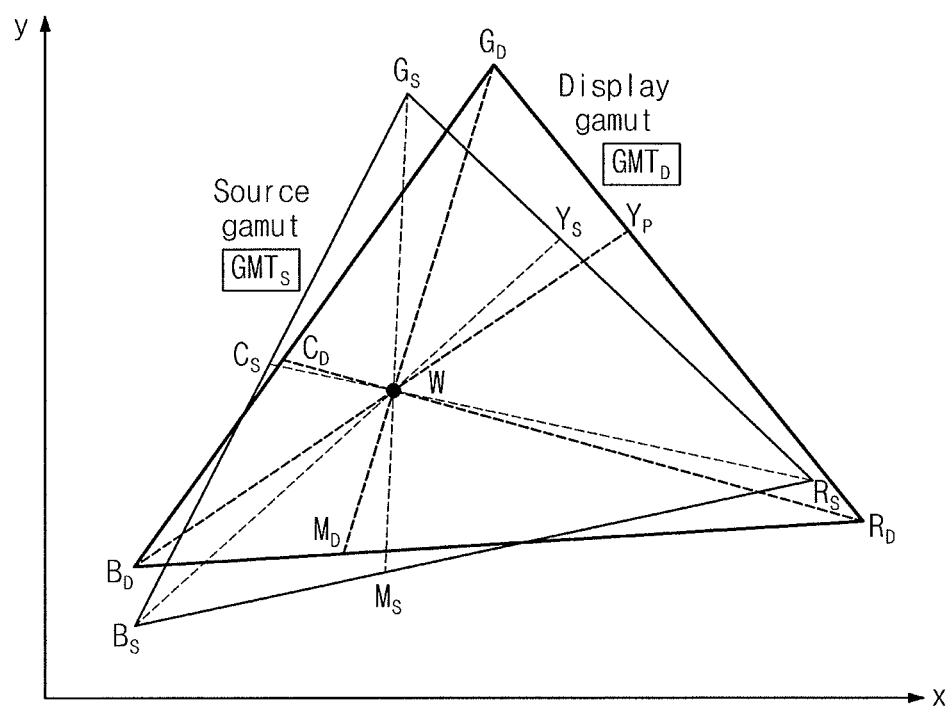
FIG. 1 illustrates an example of xy chromaticity diagram.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
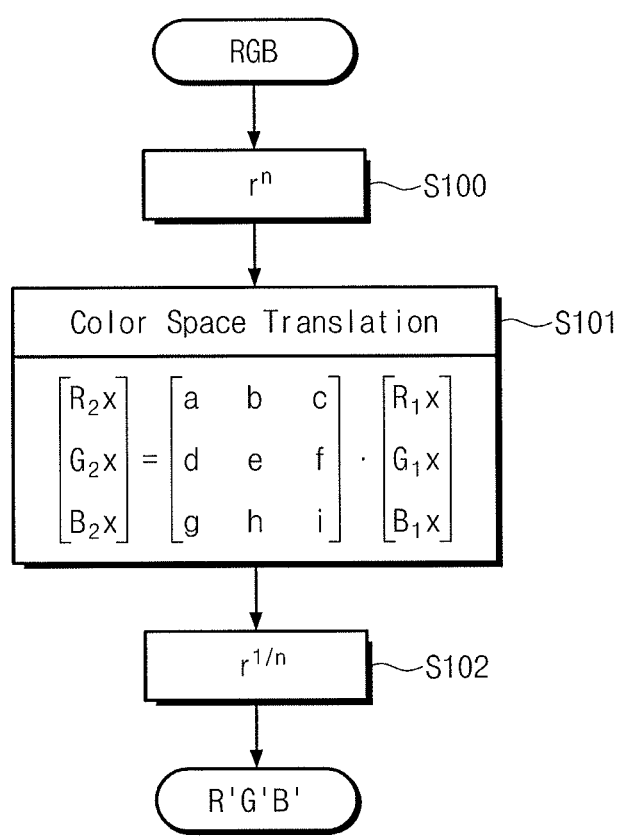
FIG. 2 illustrates a color mapping flow chart for space translation.

FIG. 2 illustrates an embodiment of a method for mapping colors using space translation. As illustrated in FIG. 2, in the event that γ correction (gamma translation, y=x1/γ), where γ=2.2, about an input image signal (e.g., sRGB) is performed in operation S100, a signal translation circuit of an image display device performs inverse gamma translation about an input image signal, to translate the input image signal into an optically linear signal. The inverse gamma translation about an input image signal may be performed according to the Equation (1).

$$f_1(Dx) = Dx^{2.2} (Dx=Rx \text{ or } Gx \text{ or } Bx) \quad (1)$$

Next, for translation of a space into a source gamut, in operation S101, the signal translation circuit, expressed by Equation (2), calculates a matrix about data obtained after inverse gamma translation, based on a matrix MS of the source gamut and a matrix MD of a display gamut.

$$f_2(Dx) = \begin{bmatrix} R_2x \\ G_2x \\ B_2x \end{bmatrix} \quad (2)$$

$$= M_D^{-1} \cdot M_S \cdot \begin{bmatrix} R_1x \\ G_1x \\ B_1x \end{bmatrix}$$

-continued $$= \begin{bmatrix} a & b & c \\ d & e & f \\ g & h & i \end{bmatrix} \cdot \begin{bmatrix} R_1x \\ G_1x \\ B_1x \end{bmatrix}$$

Finally, an RGB value may be obtained by performing gamma translation about the input image signal after the matrix calculation according to Equation (3).

$$f_3(Dx)=Dx^{1/2.2} (Dx=Rx \text{ or } Gx \text{ or } Bx) \quad (3)$$

Equation (4) may be based on the above-described functions.

$$f(Dx)=f_3 \circ f_2 \circ f_1(Dx)$$

$$R'x=(a \cdot Rx^{2.2}+b \cdot Gx^{2.2}+c \cdot Bx^{2.2})^{1/2.2}$$

$$G'x=(d \cdot Rx^{2.2}+e \cdot Gx^{2.2}+f \cdot Bx^{2.2})^{1/2.2}$$

$$B'x=(g \cdot Rx^{2.2}+h \cdot Gx^{2.2}+i \cdot Bx^{2.2})^{1/2.2} \quad (4)$$

Thus, by deducing a translation matrix in f2( ), an input image signal defined on the source gamut may be converted into a chromaticity coordinate of a display panel gamut. It is therefore possible to make a tone of an input image correspond to a tone of a display.

Also, display matrix MD may be obtained more easily compared with an RGB color coordinate and a white color value of an XYZ color system, and it may be defined as a standard in a standardized gamut.

Further, one of R2x, G2x, or B2x obtained by f2( ) when 0 to 1 are expressed with R2x, G2x, and B2x normalized as 1 has a negative value may mean mapping onto a chromaticity coordinate that cannot be expressed in the display gamut.

In a first embodiment, a translation matrix of f2( ) for the above-described color mapping is switched dynamically according to saturation (e.g., a distance S from the location of a white color) of a color of a translation target in a source gamut. Translation into a tone of a display gamut, where a tone difference at the source gamut decreases, may be made with respect to an area where the above-described saturation is low. As it approaches an area with high saturation, adjustment is made to correspond to a corner shape of the display gamut. Thus, it is possible to implement a dynamic range of the display gamut fully.

Figure 3:
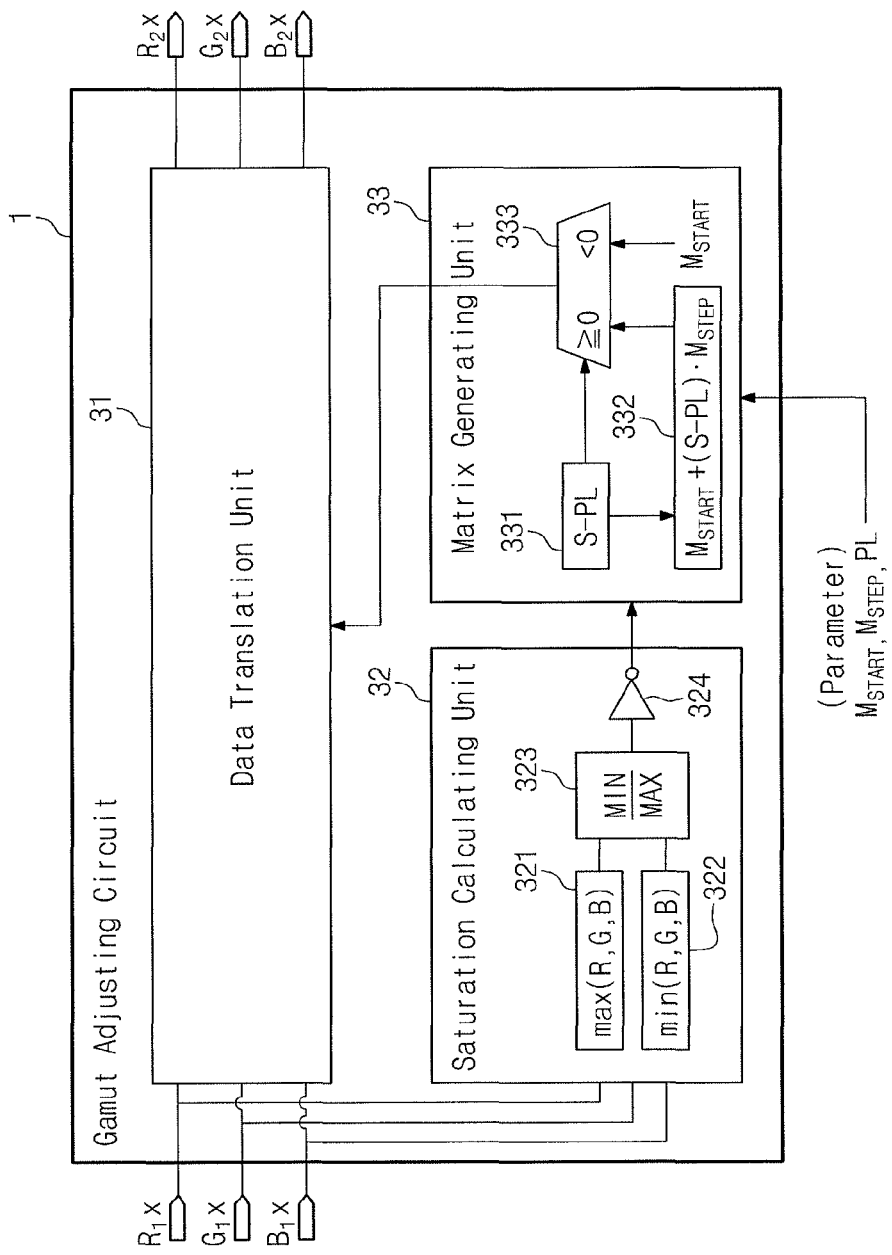
FIG. 3 illustrates an embodiment of a data translation unit circuit.

FIG. 3 illustrates an embodiment of a gamut adjusting circuit 1 included in an image display device. Referring to FIG. 3, gamut adjusting circuit 1 includes data translation unit 31, a saturation calculating unit 32, and a matrix generating unit 33. Input image signals R1x, G1x, and B1x are provided to data translation unit 31 and saturation calculating unit 32. The matrix generating unit 33 receives an output S (saturation) of saturation calculating unit 32. The matrix generating unit 32 receives a plurality of input parameters PL, MSTART, and MSTEP and has an output terminal connected to data translation unit 31. Herein, PL corresponds to a threshold value, MSTART corresponds to a start translation matrix, and MSTEP indicates a matrix interpolation step. Parameters PL, MSTART, and MSTEP may be calculated by an external device and stored in a memory. The memory may be included in parameter calculating unit 35 or a different location.

Figure 4:
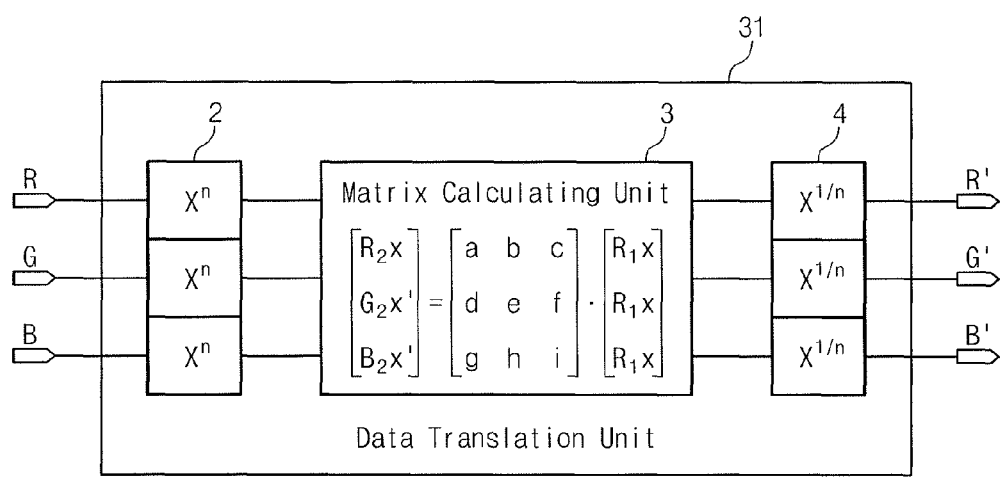
FIG. 4 illustrates an embodiment of a gamut adjusting circuit.

FIG. 4 illustrates an embodiment of a data translation unit 31 in FIG. 3. As illustrated in FIG. 4, data translation unit 31 includes an inverse gamma translation unit 2 that receives image signals R1x, G1x, and B1x, a matrix calculating unit 3 connected to an output of inverse gamma translation unit 2, and a gamma translation unit 4 connected to matrix calculating unit 3.

The inverse gamma translation unit 2 performs inverse gamma translation (y=xn), corresponding to operation S100 in FIG. 2, with respect to brightness signals R, G, and B of primary colors of the input image signal about an image display.

The matrix calculating unit 3 performs a matrix calculation with respect to the brightness signals R1x, G1x, and B1x of the primary colors that are inversely gamma translated. The matrix calculating unit 3 of the data translation unit 31 may perform matrix calculation based on a matrix that matrix generating unit 33 produces.

The gamma translation unit 4 performs gamma translation (y=x1/n) corresponding to operation S102 in FIG. 2, with respect to image signals R2x, G2x, and B2x, based on matrix calculation by matrix calculating unit 3.

Returning to FIG. 3, saturation calculating unit 32 calculates saturation S based on input image signals R1x, G1x, and B1x. For example, saturation calculating unit 32 includes a max calculating unit 321, a min calculating unit 322, a ratio calculating unit 323, and a gate circuit 324.

The max calculating unit 321 determines a maximum value of brightness values of three input image signals R1x, G1x, and B1x corresponding to primary colors.

The min calculating unit 322 determines a minimum value of brightness values of three input image signals R1x, G1x, and B1x.

The ratio calculating unit 323 calculates a ratio of the minimum value to the maximum value.

The gate circuit 324 decreases the ratio calculated by the ratio calculating unit 323 from 1 to calculate the saturation S. With the above configuration, the saturation calculating unit 32 calculates saturation S every pixel to provides saturation S to matrix generating unit 33.

The matrix generating unit 33 includes a saturation comparing unit 331, a linear interpolation calculating unit 332, and a unit 333. The saturation comparing unit 331 compares saturation S from saturation calculating unit 32 with the threshold value PL and outputs a value (S−PL).

The linear interpolation calculating unit 332 performs linear interpolation calculation (MSTART+(S−PL)·MSTEP) based on calculated value (S−PL), a start translation matrix MSTART, and a matrix interpolation step MSTEP.

The unit 333 sets data translation unit 31 with start translation matrix MSTART as a translation matrix when a polarity of the calculated value (S−PL) is negative. When a polarity of the calculated value (S−PL) is positive, unit 333 sets data translation unit 31 with linear interpolation translation matrix M' MSTART+(S−PL)·MSTEP) calculated by the linear interpolation calculating unit 332.

With this configuration, matrix generating unit 33 sets data translation unit 31 with a translation matrix by the pixel. Also, the start translation matrix MSTART may be a spatial translation matrix that makes a tone of a color to be displayed on a display panel correspond to an original tone of an input image signal.

The data translation unit 31 outputs image signals R2x, G2x, and B2x by executing matrix calculation about input image signals R1x, G1x, and B1x by the pixel, based on a matrix MSTART or M' set by matrix generating unit 33.

Figure 5:
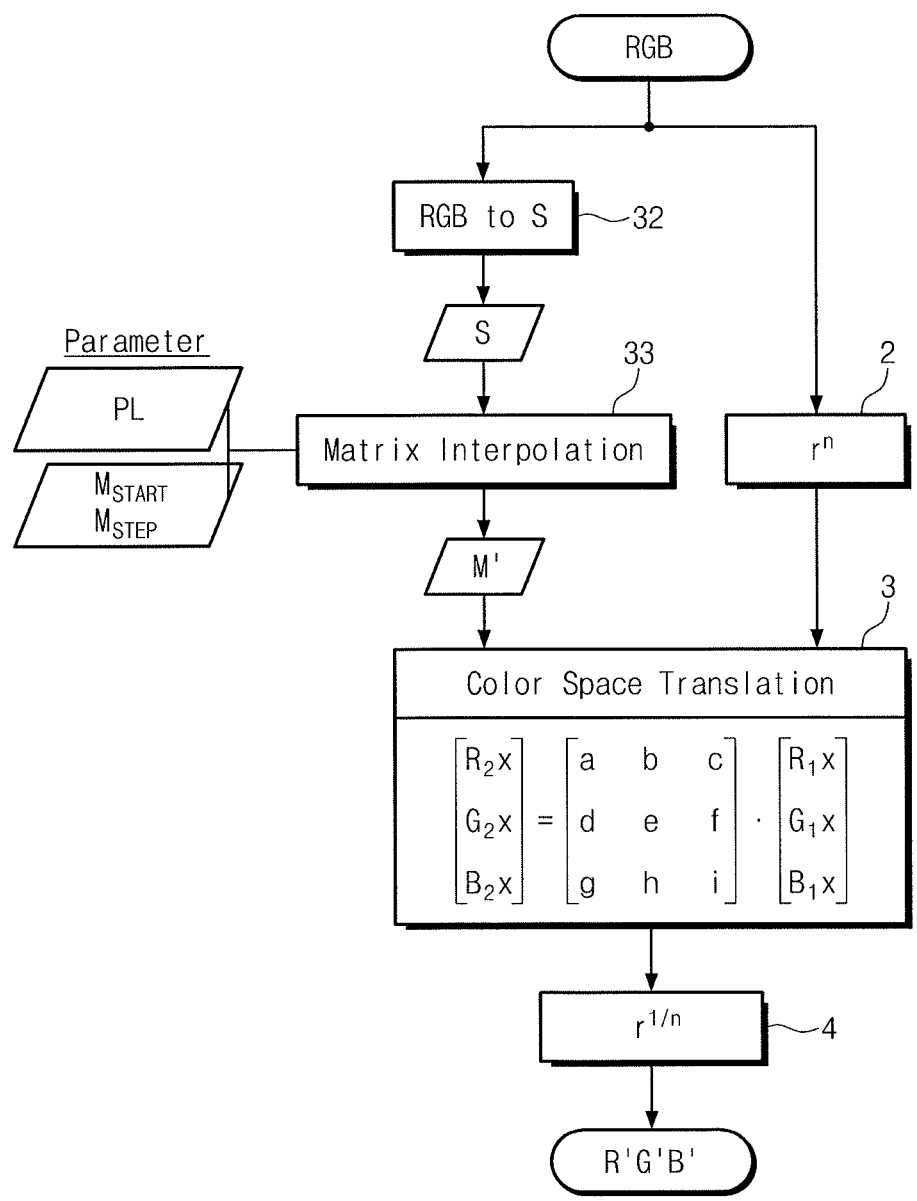
FIG. 5 illustrates an embodiment of a color mapping flow chart.

FIG. 5 illustrates an example of a correlation between functions of circuit blocks in FIGS. 3 and 4. In FIG. 5, operations are labeled using the same reference numerals of circuit blocks in FIGS. 3 and 4.

Figure 6:
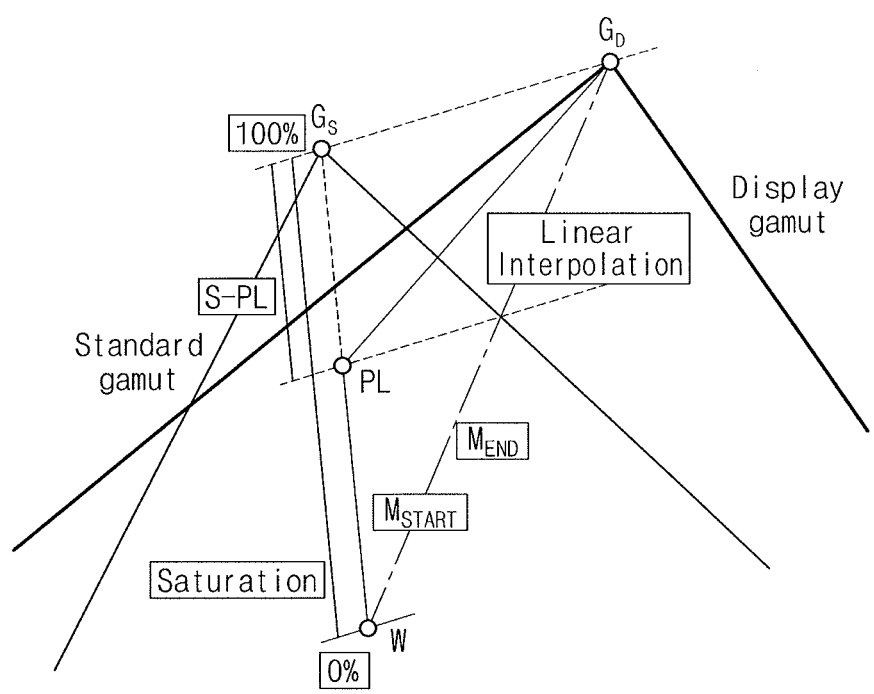
FIG. 6 illustrates an embodiment of a gamut adjustment.

FIG. 6 illustrates an embodiment of gamut adjustment for the example of a green color. A green color of a display gamut (display green color GD) and a green color of a source gamut (source green color GS) may differ on a chromaticity coordinate. A translation matrix M (refer to Equation (5)) is generated to enable the tone of a color displayed on a display panel to correspond to an original tone of an input image signal. The translation matrix may correspond to a start translation matrix MSTART.

$$M = M_D^{-1} \cdot M_S \qquad (5)$$

Saturation S may be obtained by Equation (6) based on input image signals R1x, G1x, and B1x.

$$S = \frac{MAX - MIN}{MAX} \qquad (6)$$
$$= 1 - \frac{MIN}{MAX}$$

if

MAX = 0 then

S = 0

MAX = max(R, G, B)

MIN = min(R, G, B)

In a xy chromaticity diagram, saturation S increases toward the outermost color of the gamut, when a white color used as a starting point. In an area where saturation of the source gamut is high, a chromaticity coordinate is adjusted slowly toward a maximum saturation on the threshold value PL, because a chromaticity coordinate that cannot be expressed on the display gamut exists.

At this time, start translation matrix MSTART is used when saturation S is below threshold value PL. Because MS in FIG. 5 is replaced with MD corresponding to a display green color GD in case of maximum saturation, translation matrix M becomes a unit matrix expressed by Equation (7) and defined as end translation matrix MEND.

$$MEND = M_D^{-1} \cdot M_D \qquad (7)$$
$$= \begin{bmatrix} 1 & 0 & 0 \\ 0 & 1 & 0 \\ 0 & 0 & 1 \end{bmatrix}$$

If a value of saturation S is greater than threshold value PL, a plurality of linear interpolation translation matrixes M' MSTART+(S−PL)·MSTEP) may be generated by performing linear interpolation up to end translation matrix MEND, based on start translation matrix MSTART, according to Equation (8).

$$M_{DIFF} = M_{END} - M_{START} \qquad (8)$$
$$M_{STEP} = \frac{1}{100\% - PL} \cdot M_{DIFF}$$
$$SEED = S - PL$$

-continued
$$M' = M_{START} + SEED \cdot M_{STEP}$$
$$= \begin{bmatrix} STARTa & STARTb & STARTc \\ STARTd & STARTe & STARTf \\ STARTg & STARTh & STARTi \end{bmatrix} + SEED \cdot \begin{bmatrix} STEPa & STEPb & STEPc \\ STEPd & STEPe & STEf \\ STEPg & STEPh & STEPi \end{bmatrix}$$

In Equation (8), 100% may indicate a maximum value of saturation S.

Upon linear interpolation, division may be made to obtain matrix interpolation step MSTEP. Because a display gamut and a source gamut are determined before shipping, it is possible to calculate matrix interpolation step MSTEP before shipping. A division circuit is not required by pre-setting matrix interpolation step MSTEP as an input parameter when a circuit is implemented. Thus, it is possible to reduce circuit size and to shorten processing time.

Figure 7:
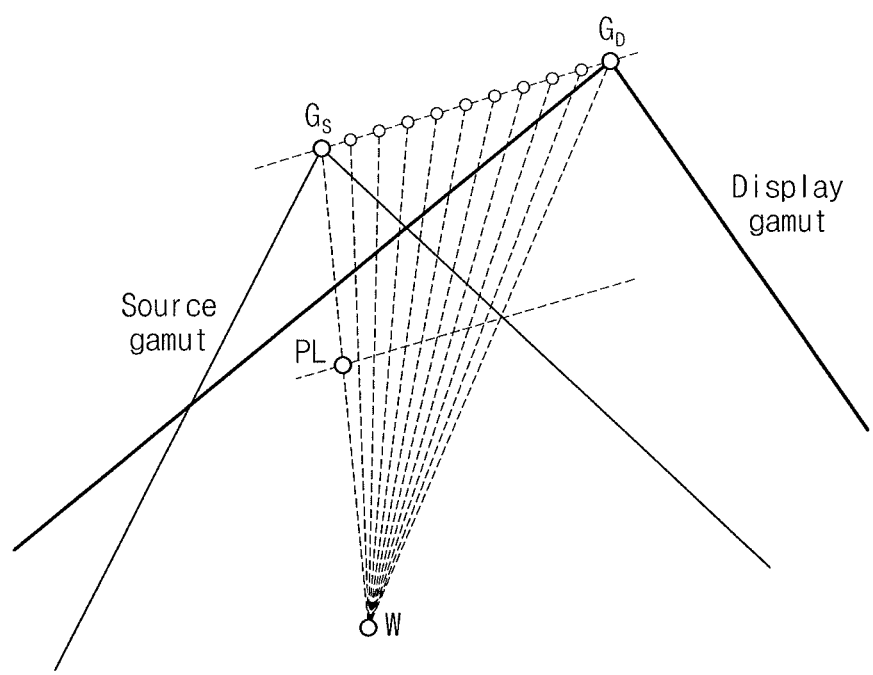
FIG. 7 illustrates an embodiment of linear interpolation hue progress.

As illustrated in FIG. 7, if linear interpolation is performed from MSTART to MEND, a chromaticity coordinate after translation (in the event that matrix calculation about primary green color G is executed based on each linear interpolation translation matrix M') follows a trace of an auxiliary line GS-GD. For example, in the event that saturation S is greater than or equal to threshold value PL and smaller than a maximum value, saturation is rotated in a GD direction, using white color W on a xy chromaticity diagram as a starting point, according to an increase in saturation S.

In case of a maximum saturation, a translation matrix is switched to correspond to a maximum saturation GD of the display gamut. Also, a color rotation ratio is determined as an interpolation ratio SEED (=S−PL). Thus, it is unnecessary to calculate hue and a hue rotation ratio separately.

As interpolation ratio SEED increases, a linear interpolation translation matrix M' for calculation is sequentially switched. Because hue is spread after slow translation, jumping of the hue is not generated. Saturation S is used only for comparison with threshold value PL before branching and for calculation of an interpolation ratio, but very accurate calculation is not required for comparison with threshold value PL before branching. Also, if a difference between the display gamut and source gamut is not excessive, the interpolation ratio need not require a very accurate value. Thus, a division unit for calculating saturation may be implemented with low accuracy.

Also, a probability exists that a result as well as the display gamut is calculated. In this case, a 0 clipping may be performed about an element causing a calculation result below 0. As a result, clipping to the outermost of the display gamut may be performed. Also, threshold value PL may be adjusted to prevent such a case.

As described above, in accordance with the first embodiment, LUT with a large size is not required. Also, an effect is sufficiently obtained using less circuit resources and simpler circuit configuration.

In the event that a value of saturation S is less than threshold value PL, it is possible to enable the tone of a color displayed on a display panel to correspond to a primary tone of an input image signal.

In the event that a value of saturation S is greater than threshold value PL, it is possible to use a maximum gamut of the display panel. However, jumping about the saturation is not generated between the maximum gamut and minimum gamut. Also, the threshold value PL is only used as a parameter for adjustment. Thus, it is possible to easily adjust mapping about a chromaticity coordinate of the product.

Figure 8:
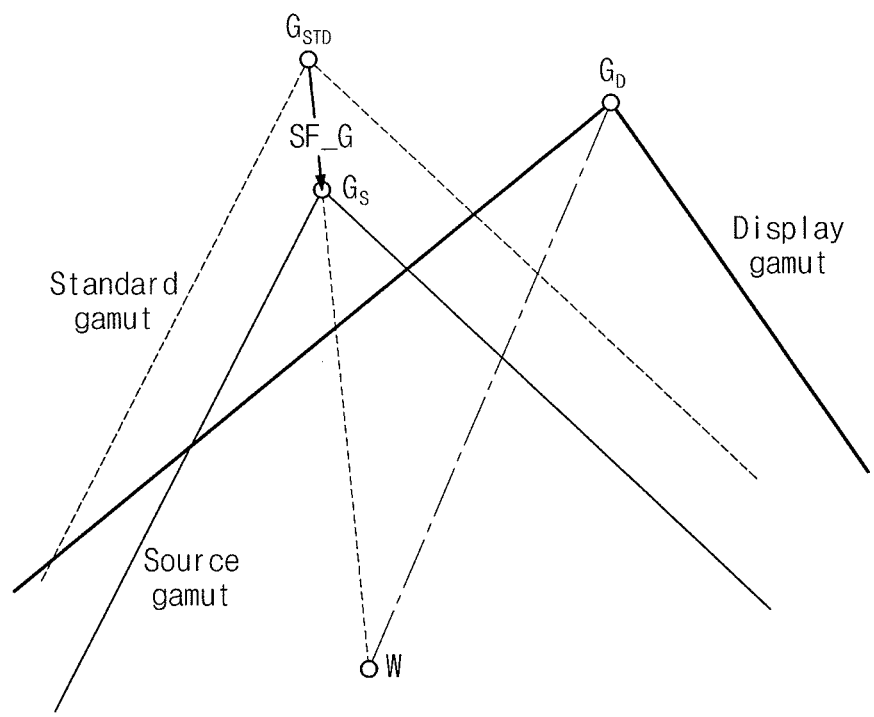
FIG. 8 illustrates source gamut adjustment according to one embodiment.

Also, in FIG. 8, gamut compression is performed when a display gamut is narrower than a source gamut. Also, the number of color coordinates capable of being mapped on a saturation vector W-GSTD of the source gamut is less. As a result, a gray scale level about the saturation may be improved while saturation maintained.

Linear expansion about the gamut may be performed when the display gamut covers the source gamut sufficiently, thereby obtaining a gray scale level about the saturation where a color is considered important. The gamut scaled as described above may be defined as the source gamut, so a color reproduction characteristic is improved.

The scaled chromaticity coordinate is obtained easily by calculating a chromaticity coordinate upon vector calculation about an orthogonal coordinate system using a xy chromaticity diagram. Also, the quantity to be scaled may be adjusted with respect to each of RGB primary colors. Because scaling is processed upon parameter calculation and a processed result is embedded in an element of a start translation matrix MSTART, a specific circuit is not required.

Previously, an example was described in which an end translation matrix MEND is set to be used up to an outer corner of the display gamut. But, the end translation matrix MEND may be set such that chromaticity coordinates of RGB primary colors after translation become any coordinates in the display gamut.

As illustrated in FIG. 1, RGB primary colors and CMY complementary colors do not correspond to each other in the display gamut and source gamut The case where correspondence occurs may be uncommon. In RGB and CMY, deviation of a gamut coordinate are different from each other. For this reason, the gamut shown by the xy chromaticity diagram may have nothing to do with similarity.

If matrix translation is executed under a condition that a unique start translation matrix and a unique end translation matrix are applied over the gamut, an adjustable range narrows due to a deviation condition about one of RGB or CMY.

In a second embodiment, a source space is divided into six regions according to a color. Also, input parameters (e.g., a threshold value PL, a start translation matrix MSTART, and an end translation matrix MEND) about each region are defined independently. Thus, a gamut adjusting method may be provided with wider gamut or higher freedom.

Figure 9:
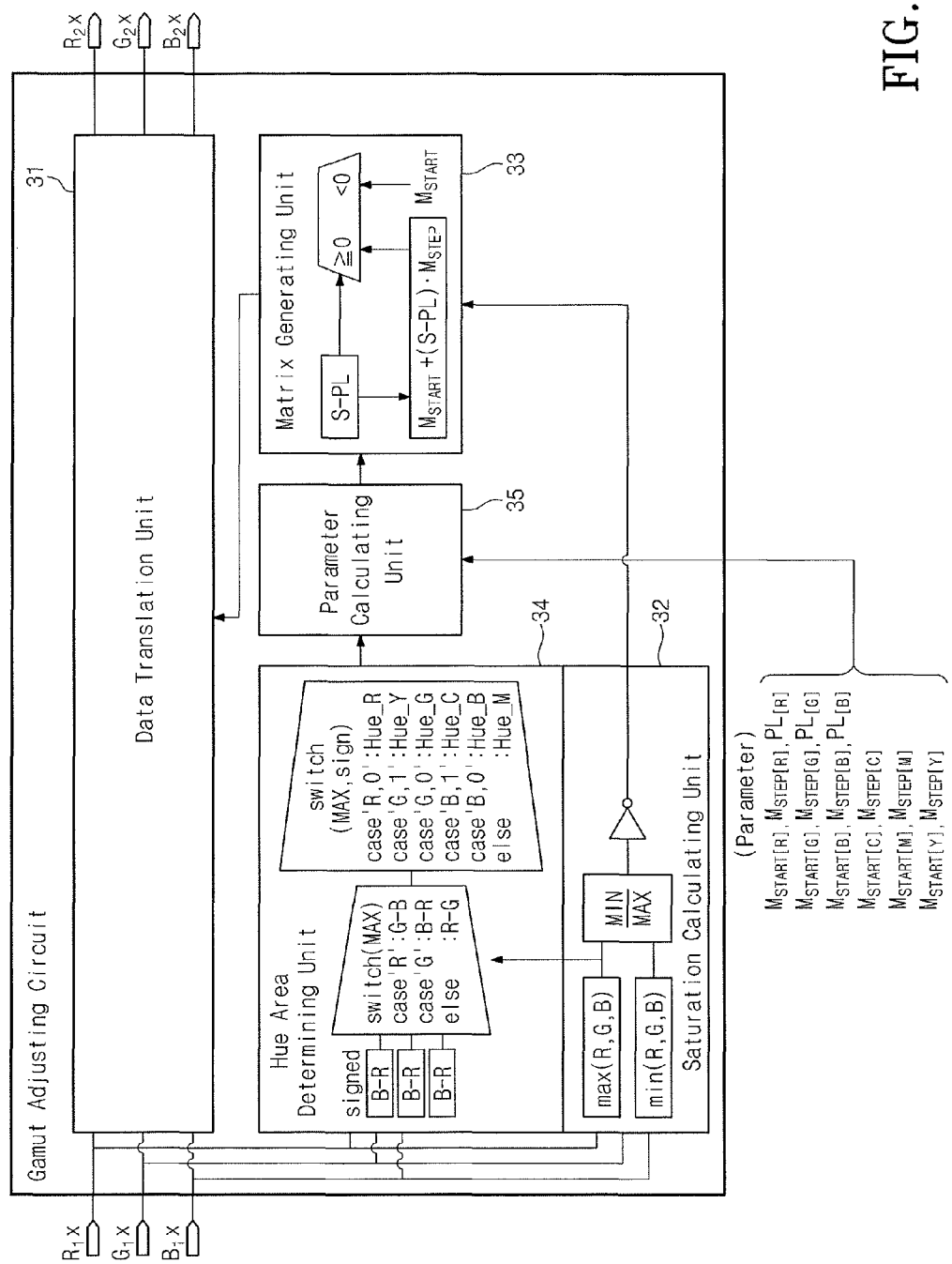
FIG. 9 illustrates an embodiment of a gamut adjustment flow chart.

FIG. 9 illustrates an embodiment of a gamut adjusting circuit. As shown in FIG. 9, a second embodiment is different from the first embodiment in that threshold values PL[R], PL[G], and PL[B] for primary colors are respectively provided, and a start translation matrix MSTART and a matrix interpolation step MSTEP are previously calculated and set by the primary color and by the complementary color. Thus, a hue area determining unit 34 may be included for calculating a hue area Hue_Area, not input image signals R1x, G1x, and B1x.

Also, there may be provided a parameter calculating unit 35 to select three types of input parameters (e.g., a threshold value PL, a start translation matrix MSTART, and an end translation matrix MSTEP) corresponding to the hue area Hue_Area calculated by hue area determining unit 34. The selected parameters may be provided to matrix generating unit 33.

In FIG. 9, functions of data translation unit 31, saturation calculating unit 32, and matrix generating unit 33 may be substantially the same as those described with reference to the first embodiment and marked by the same reference numerals.

Figure 11A:
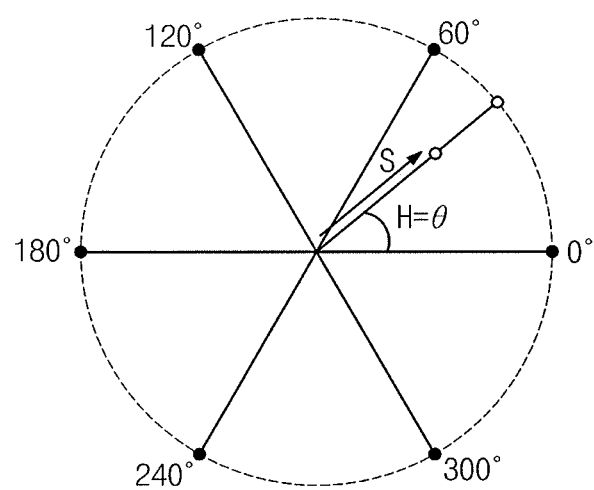
FIG. 11A-11B illustrate an embodiment of hue area diagram.
Figure 11B:
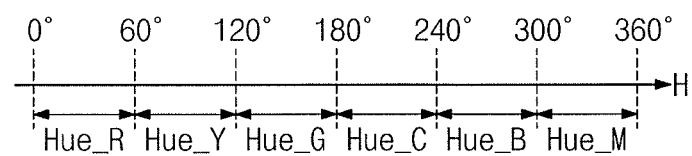

FIG. 11A illustrates polar coordinates and FIG. 11B illustrates one-dimensional coordinates. As shown in the Table 1, a source gamut is divided into six areas (hue areas) based on the angle of 60° under condition that a red color R has 0°.

TABLE 1

| Area | Symbol | Hue [θ] |
|------|--------|---------|
| #1 | Hue_R | 0° ≤ Hue_R < 60° |
| #2 | Hue_Y | 60° ≤ Hue_Y < 120° |
| #3 | Hue_G | 120° ≤ Hue_G < 180° |
| #4 | Hue_C | 180° ≤ Hue_C < 240° |
| #5 | Hue_B | 240° ≤ Hue_B < 300° |
| #6 | Hue_M | 300° ≤ Hue_M < 360° (0°) |

In the second embodiment, a start translation matrix MSTART and an end translation matrix MEND are set with respect to each hue area. A matrix interpolation step MSTEP may be calculated as described with reference to the first embodiment.

Due to the following cause, the start translation matrix MSTART and the end translation matrix MEND may not be calculated directly from a source gamut GMTS and a display gamut GMTD. That is, the start translation matrix MSTART and end translation matrix MEND may be calculated based on two virtual gamuts (e.g., a start gamut GMTSTART and an end gamut GMTEND) corresponding to the source gamut GMTS and the display gamut GMTD.

Figure 12:
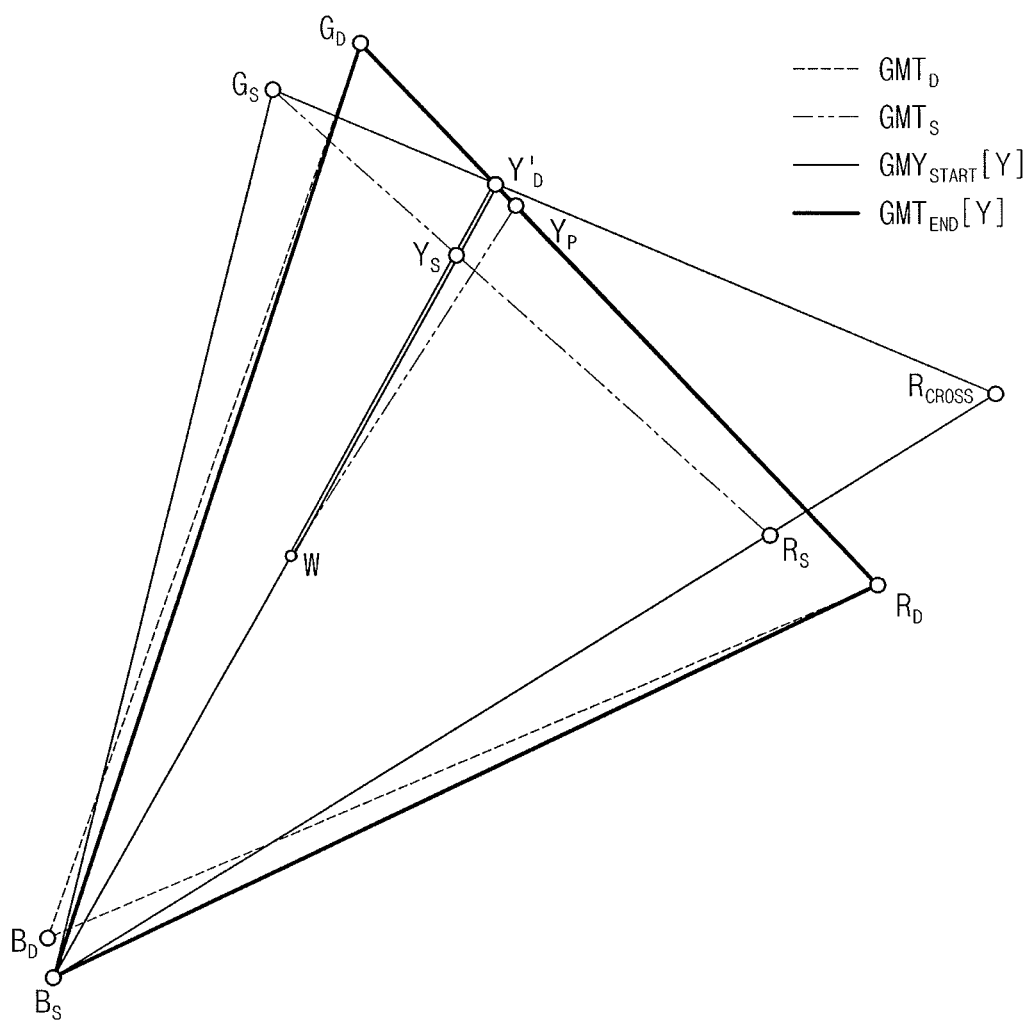
FIG. 12 illustrates an embodiment of a method for setting a start gamut and an end gamut of a yellow hue area.

FIG. 12 illustrates an example of setting a start gamut GMTSTART and an end gamut GMTEND of a yellow hue area Hue_Y. As illustrated in FIG. 12, in a xy chromaticity diagram, each gamut (source gamut GMTS and display gamut GMTD) is formed to have a triangle shape with three vertexes are R, G, and B. However, similarity does not exist between triangles of the source gamut GMTS and display gamut GMTD.

Assuming that a white color W is a starting point as an achromatic color, a deviation between direction vectors (saturation vectors), corresponding to a vertex of a triangle, of the gamuts may occur. In the event that a green color being a primary color is focused on, a direction vector toward GD from W is different from a direction vector toward GS from W. To make the tone of a color expressed on a display panel correspond to an original tone of an input image signal, the tone after translating about a color on a line GD-W may be made to correspond to a vector toward GS from W.

Consider the case of setting a chromaticity coordinate of a maximum saturation after translation to a location GD different from a vector toward GS from W. As saturation increases toward the maximum saturation from a minimum saturation W, mapping is executed according to a vector toward GS from W. During mapping, a direction may be switched toward a chromaticity coordinate GD of the maximum saturation. This vector switching point may be a threshold value PL as described with reference to the first embodiment.

As a complementary color, YCM (Yellow, Cyan, and Magenta) will be described. In the first embodiment, because a direction vector toward YD from W is different from a direction vector toward YS from W, a direction may be changed at the saturation W which has a value is greater than threshold value PL. In the event that each gamut is divided into six areas according to tone as illustrated in the Table 1, it is possible to make a vector of the source gamut toward YS from W fully correspond to a direction vector of the display gamut GMTD toward an outer corner.

For example, to divide the gamut from 0° every 60° may mean to divide the gamut with primary colors R, G, and B and complementary colors C, M, and Y as the boundary. In the chromaticity diagram, complementary colors C, M, and Y are placed at points where extensions of lines connect primary colors R, G, and B, being vertexes of a triangle. The white color W and edges of the triangle intersect.

Consider the case of extending a line connecting a vertex of a triangle to a point existing inside the triangle. In this case, an extension line and an edge of the triangle always intersect. A vector of the source gamut GMTS toward YS from W fully corresponds to a direction vector toward a display yellow y', by setting an intersection of a vector toward YS from W and an outer corner of the display gamut GMTD to a display yellow Y'D after adjustment. This means correspondence of a yellow saturation vector.

Next, as virtual gamut, a start gamut GMTSTART[Y] and an end gamut GMTEND[Y] are generated to obtain a start translation matrix MSTART[Y] and an end translation matrix MEND[Y] for a yellow hue area Hue_Y. Because a yellow color after adjustment is set to Y'D, triangles of the start gamut GMTSTART[Y] and the end gamut GMTEND[Y] have to pass through the point Y'D. Also, because a vector toward YS from W is not changed, a blue color of the end gamut GMTEND[Y] shares BS being a blue color of the source gamut GMTS. In a green color with a hue angle of 120°, like the first embodiment, the start gamut GMTSTART[Y] and the end gamut GMTEND[Y] use a point GS and a point GD, respectively.

Finally, because a red color may not be adjusted outside the display gamut GMTD over line GD-RD, a display red RD is taken from the end gamut GMTEND[Y]. Also, a point RCROSS at which lines GS-Y'D and BS-RS intersect is taken from start gamut GMTSTART[Y]. Thus, the point RCROSS is outside of display gamut GMTD. However, no problem occurs because it is a color getting out of a corresponding hue area.

Like the first embodiment, the start translation matrix MSTART[Y] and end translation matrix MEND[Y] are calculated based on two virtual gamuts (start gamut GMTSTART[Y] and end gamut GMTEND[Y]), and a matrix interpolation step is calculated based on the start translation matrix MSTART[Y] and end translation matrix MEND[Y].

A start translation matrix MSTART[R] and an end translation matrix MEND[R] of a red hue area Hue_R may be produced in a similar manner as described above, except that they are produced to pass through yellow color Y'D after adjustment. Other hue areas may be handled in a similar manner as well as the above-described hue areas.

A start translation matrix MSTART and an end translation matrix MEND are generated from six start gamuts GMT-START and six end gamuts GMTEND produced as described above, and a matrix interpolation step MSTEP is calculated. The start translation matrix MSTART, end translation matrix MEND, and matrix interpolation step MSTEP are used as input parameters.

A threshold value PL is defined to be shared at two division areas adjacent to a hue angle of each of the primary colors R, G, and B. Also, because the same chromaticity coordinate is used as the start gamut GMTSTART and end gamut GMTEND, each of the complementary colors C, M, and Y does not necessitate a threshold value. Thus, as shown in Table 2, there may be three threshold values PL: PL[G] assigned to Hue_Y and Hue_G, PL[B] assigned to Hue_C and Hue_B, and PL[R] assigned to Hue_M and Hue_R.

TABLE 2

| Area | Symbol |
|---|---|
| Hue_M - Hue_R | $PL_{[R]}$ |
| Hue_Y - Hue_G | $PL_{[G]}$ |
| Hue_C - Hue_B | $PL_{[B]}$ |

In the second embodiment, three types of input parameters (e.g., threshold value PL, start translation matrix MSTART, and matrix interpolation step MSTEP) that are previously calculated every hue area Hue_Area may be stored in a memory. The memory may or may not be included parameter calculating unit 35.

According to one approach, hue H may be calculated based on Equation (9).

$$H = \begin{cases} 60 \times \dfrac{G-B}{MAX-MIN} + 0 & \wedge \text{ if } MAX = R \\ 60 \times \dfrac{B-R}{MAX-MIN} + 120 & \wedge \text{ if } MAX = G \\ 60 \times \dfrac{R-G}{MAX-MIN} + 240 & \wedge \text{ if } MAX = B \end{cases} \quad (9)$$

if $MAX = 0$ then $H = 0$ $MAX = \max(R, G, B)$ $MIN = \min(R, G, B)$

As understood from Equation (9), a hue angle calculating circuit for calculating a specific value of hue H requires a division circuit. This may cause an increase in circuit size and processing time.

However, a method for determining a hue area every pixel may be performed using hue area determining unit 34. In accordance with the second embodiment and based on Equation (10), hue area determining unit 34 may execute condition branching and subtraction only to determine whether input image signals R1x, G1x, and B1x belong to any hue area. The hue area determining unit 34 notifies the determined hue area to parameter calculating unit 35. The hue area determining unit 34 does not have a division circuit, thereby reducing circuit size and processing time.

$$\textit{diff} = \begin{cases} G-B & \wedge \text{ if } MAX = R \\ B-R & \wedge \text{ if } MAX = G \\ R-G & \wedge \text{ if } MAX = B \end{cases} \quad (10)$$

$$\textit{Hue\_Area} = \begin{cases} \text{Hue\_R} & \wedge \text{ if}(MAX = R \,\&\&\, \textit{diff} \geq 0) \\ \text{Hue\_Y} & \wedge \text{ if}(MAX = G \,\&\&\, \textit{diff} < 0) \\ \text{Hue\_G} & \wedge \text{ if}(MAX = G \,\&\&\, \textit{diff} \geq 0) \\ \text{Hue\_C} & \wedge \text{ if}(MAX = B \,\&\&\, \textit{diff} < 0) \\ \text{Hue\_B} & \wedge \text{ if}(MAX = B \,\&\&\, \textit{diff} \geq 0) \\ \text{Hue\_M} & \wedge \text{ if}(MAX = R \,\&\&\, \textit{diff} < 0) \end{cases}$$

$MAX = \max(R, G, B)$
$MIN = \min(R, G, B)$

The parameter calculating unit 35 selects three types of input parameters (e.g., threshold value PL, start translation matrix MSTART, and matrix interpolation step MSTEP) corresponding to a hue area provided from hue area determining unit 34. The selected input parameters are provided to matrix generating unit 33.

The matrix generating unit 33 compares saturation S from saturation calculating unit 32 with threshold value PL to calculate SEED (=S−PL) in saturation comparing unit 331. Also, matrix generating unit 33 calculates a linear interpolation translation matrix M' (=MSTART+SEED·MSTEP). If the polarity of SEED is negative, data translation unit 31 is set with the start translation matrix MSTART as a translation matrix. If the polarity of SEED is positive, data translation unit 31 is set with the linear interpolation translation matrix M' (=MSTART+SEED·MSTEP) as a translation matrix. The data translation unit 31 outputs image signals R2x, G2x, and B2x by performing matrix calculation about input image signals R1x, G1x, and B1x based on a matrix MSTART or M', set by matrix generating unit 33, every pixel.

Figure 10:
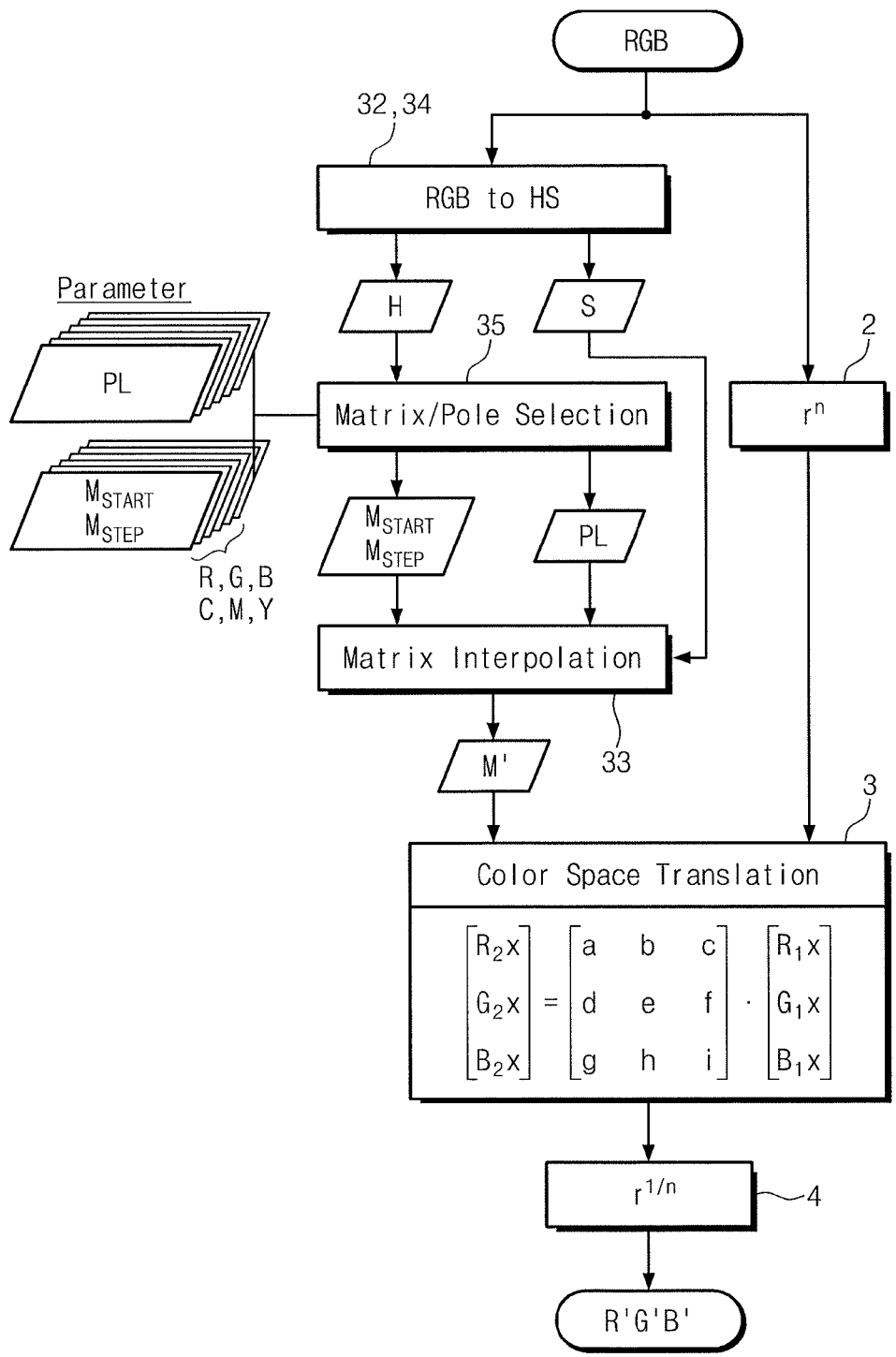
FIG. 10 illustrates another embodiment of a gamut adjusting circuit.

FIG. 10 is a flow chart (gamut adjustment flowchart) illustrating an embodiment showing a correlation between functions of circuit blocks in FIGS. 4 to 9. In FIG. 10, steps are marked by reference numerals of circuit blocks in FIGS. 4 to 9.

Figure 13:
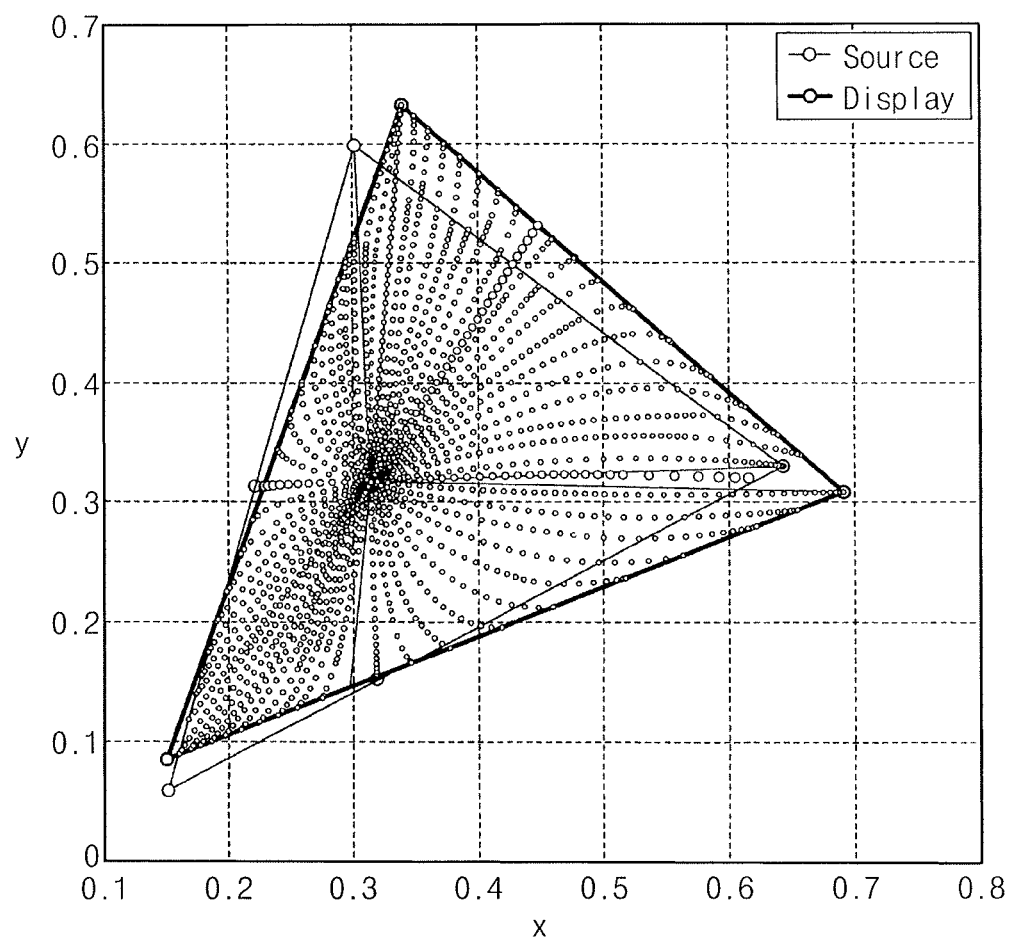
FIG. 13 illustrates a gamut adjusting example.

With the second embodiment described above, it is possible to adjust the gamut to use the whole area of the display gamut GMTD, as illustrated in FIG. 13, by dividing the gamut into six areas. Because C'D, Y'D, and M'D are used when calculating a start translation matrix MSTART and a matrix interpolation step MSTEP, it is possible to make a saturation vector of a complementary after translation correspond to a saturation vector of a complementary color of a source gamut. Therefore, correspondence to the saturation of an input image is possible.

Also, color jumping is not generated at a boundary of a hue area, because a start translation matrix MSTART and matrix interpolation step MSTEP are calculated using the same complementary color chromaticity coordinates C'D, Y'D, and M'D, and also the same threshold value PL is used.

Figure 14:
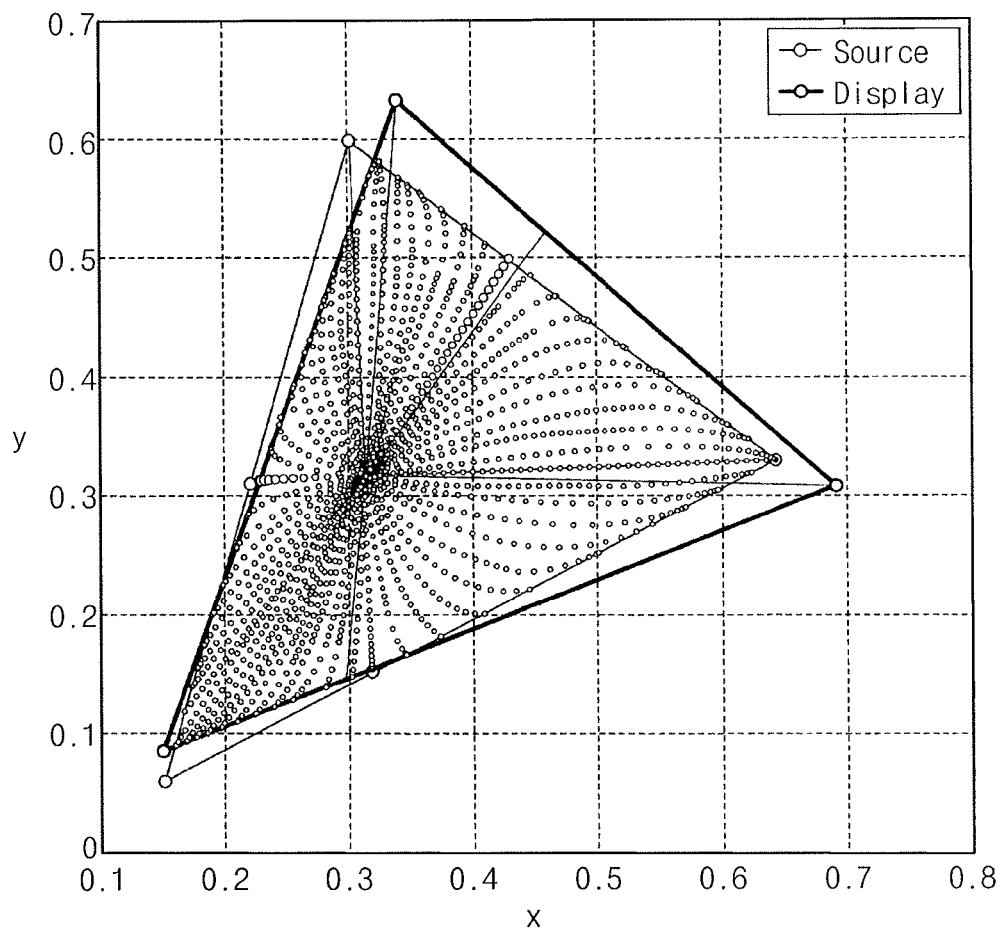
FIG. 14 illustrates another gamut adjusting example.
Figure 15:
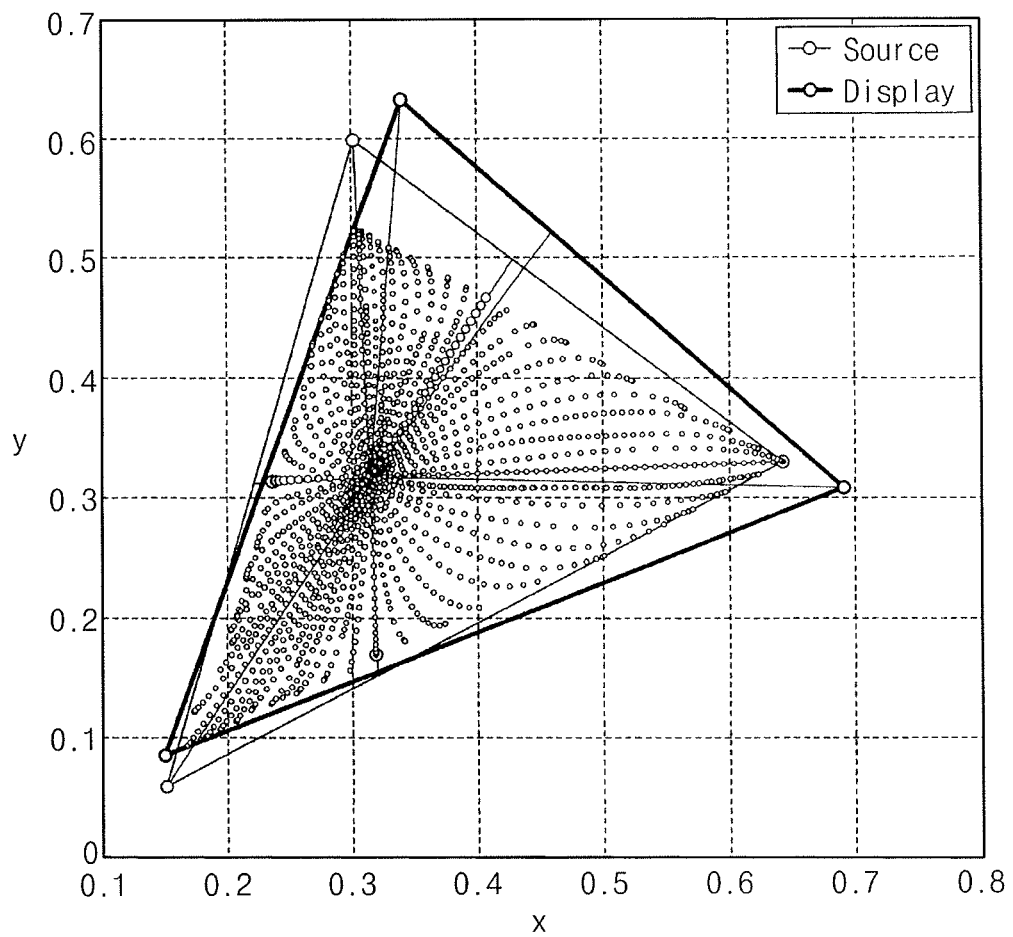
FIG. 15 illustrates another gamut adjusting example.

Also, in the second embodiment, mapping may be variously performed without a change of a circuit configuration. This may be accomplished, for example, by adjusting previously set input parameters (e.g., threshold value PL, start translation matrix MSTART, and matrix interpolation step MSTEP). For example, as illustrated in FIG. 14, it is possible to give priority to true color reproduction by mapping the tone after translation only within an area corresponding to an intersection (GMTD n GMTS) of both gamuts. Also, it is possible to map the tone after translation within an area of a display gamut having a shape similar to a source gamut.

By way of summation and review, conventionally a display may only express color in the display gamut. Because only colors in the display gamut are expressed, a color of a hue corresponding to a location of GS or BS may not be expressed. If an input image signal distributed in the source gamut (sRGB) is used to control a display panel without modification, a color of a tone corresponding to a primary location of RS may be expressed as a color of a tone corresponding to a location of RD.

One approach that attempts to solve this problem involves mapping a chromaticity coordinate of an input image signal distributed in the source gamut (sRGB) for linear expansion or gamut compression, or by quadrating hue of a color to be displayed on a display panel with an original tone of the input image signal in an area corresponding to an intersection (GMTD ∩ GMTS) of the source gamut and the display gamut. The mapping may be performed based on a lookup table LUT about sRGB or NTSC standard values, and by converting an input image signal distributed in the source gamut using the LUT.

However, a problem may occur when the source gamut is adjusted to the display gamut through linear expansion or compression. That is, the color sense of an image displayed on the display panel may be different from the color sense of a source image.

Also, the case may arise where a tone of a color displayed on the display panel is fully matched with a primary chromaticity coordinate of the source gamut of an input image signal. In the event that the gamut (saturation range) of a display cyan color CD is narrower than that of a source cyan color CS, a color outside of a line GD-BD of the source gamut (sRGB) may not experience degeneracy clipping on the line GD-BD. For this reason, it is impossible to express such a color under these circumstances.

In an area of a hue with wider gamut (saturation range) than a source red color RS (such as a display red color RD), a tone of a color displayed on the display panel may be fully matched with a primary chromaticity coordinate in the source gamut of an input image signal. However, the capacity of the display to express colors may not be exhibited maximally because an area outside of RS of the display gamut is not used. For example, an area corresponding to a relative complement (GMTD\GMTS) of the display gamut and the source gamut is not used.

Also, a problem may occur when mapping is made through LUT conversion. As gray scale values for expressing an input RGB increase, the size of the LUT may become huge.

Also, images that provide a sense of incongruity to a viewer because of a difference between color senses (e.g., Marine's blueness, sunset, and so on) may be mostly expressed with colors of low saturation. Although colors with low saturation may be changed to colors with high saturation, a viewer may perceive inaccuracies.

One or more of the aforementioned embodiments solves these problems, without increasing circuit size and by realizing faster processing speeds with greater accuracy.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A gamut adjusting method of a gamut adjusting circuit, the method, comprising:
    calculating, by a saturation calculating circuit of the gamut adjusting circuit, a saturation of an input image signal;
    setting, by a matrix generating circuit of the gamut adjusting circuit, a translation matrix for translating the input image signal;
    executing, a matrix calculating circuit of the gamut adjusting circuit, a matrix calculation for the input image signal based on the translation matrix; and generating, by data translation circuit of the gamut adjusting circuit, an output image signal for output on a display based on the matrix calculation, wherein setting the translation matrix includes:

setting, by a matrix calculating circuit of the gamut adjusting circuit, a unit matrix as the translation matrix when a value of the saturation below a threshold value, rotating, by a matrix calculating circuit of the gamut adjusting circuit, the saturation in proportion to an increase in the saturation when the saturation value is greater than the threshold value and smaller than a maximum value of saturation, and switching, by a matrix calculating circuit of the gamut adjusting circuit, the translation matrix to correspond to or approximate a maximum saturation expressed on a display gamut, wherein a tone on the display corresponds to or approximates a tone of the input image signal when a value of the saturation is smaller than the threshold value.

2. The method as claimed in claim 1, further comprising:
defining a virtual gamut corresponding to a start translation matrix (MSTART) and an end translation matrix (MEND) for each of a plurality of divided hue areas, wherein the virtual gamut is defined such that a complementary color in one of the hue areas uses a tone defined as a same chromaticity coordinate as the MSTART and MEND and an adjacent one of the hue areas uses a same complementary tone.

3. The method as claimed in claim 2, wherein the divided hue areas correspond to a hue area divided by a predetermined angle.

4. The method as claimed in claim 3, wherein the predetermined angle is 60°.

5. The method as claimed in claim 1, wherein the matrix calculation is executed with respect to a brightness signal of each of a plurality of primary colors of the input image signal.

6. An image display device, comprising:
a saturation calculating circuit to calculate a saturation of an input image signal;
a matrix generating circuit to set a translation matrix for translating the input image signal; and
a matrix calculating circuit to execute a matrix calculation for the input image signal based on the translation matrix set by the matrix generating circuit and to output an output image signal based on the matrix calculation to a display panel, wherein the matrix generating circuit is to:
set a unit matrix as the translation matrix when a value of the saturation is below a threshold value,
rotate the saturation in proportion to an increase in the saturation when the saturation value is greater than the threshold value and smaller than a maximum value of saturation, and
switch the translation matrix to correspond to or approximate a maximum saturation expressed on a display gamut for maximum saturation, wherein a tone on the display corresponds to or approximates a tone of the input image signal when a value of the saturation is smaller than the threshold value.

7. The device as claimed in claim 6, wherein the matrix generating circuit is to:
generate and set the translation matrix by performing linear interpolation up to the translation matrix when the saturation value is greater than the threshold value and smaller than the maximum value, and set the translation matrix to the unit matrix when the saturation value is less than the threshold value.

8. The device as claimed in claim 7, wherein the matrix generating circuit is to:
when the saturation value is greater than the threshold value and smaller than the maximum value, set the translation matrix calculated by:

$$MSTART+(S-PL) \cdot MSTEP,$$

where $MDIFF=MEND-MSTART$ and $$MSTEP=MDIFF/(SMAX-PL)$$

where MSTART is a translation matrix set when the saturation value is less than a predetermined threshold value, MEND is a translation matrix set when the saturation value is a maximum value, SMAX is a maximum saturation value, and PL is a threshold value corresponding to a saturation reference.

9. The device as claimed in claim 8, further comprising:
a memory to store MSTART and MSTEP.

10. The device as claimed in claim 9, further comprising:
a hue area determining unit to determine whether a hue of the input image signal belongs to any of a plurality of hue areas on a divided saturation circle, wherein the memory is to store the PL, MSTART, and MSTEP decided for each of the hue areas, and wherein the matrix generating circuit is to decide the translation matrix based on the PL, MSTART, and MSTEP decided with respect to one of the hue areas determined by the hue area determining unit and corresponding to saturation of the input image signal.

11. The device as claimed in claim 8, wherein the translation matrix is decided using the PL, MSTART, and MSTEP calculated from a virtual gamut defined to correspond to MSTART and MEND at each of the hue areas.

12. The device as claimed in claim 6, wherein the matrix calculating circuit is to execute the matrix calculation with respect to a brightness signal of each of a plurality of primary colors of the input image signal.

13. A gamut adjusting circuit, comprising:
a saturation calculator to calculate a saturation of an input image signal;
a matrix generator to set a translation matrix for translating the input image signal; and
a data translator to execute a matrix calculation for the input image signal based on the translation matrix set by the matrix generator and to output an output image signal based on the matrix calculation to a display panel, wherein the matrix generator is to:
set a unit matrix as the translation matrix when a value of the saturation is a maximum value,
rotate the saturation in proportion to an increase in the saturation when the saturation value is greater than a threshold value and smaller than a maximum value of saturation, and
switch the translation matrix to correspond to or approximate a maximum saturation expressed on a display gamut for maximum saturation, wherein a tone on the display corresponds to or approximates a tone of the input image signal when a value of the saturation is smaller than the threshold value.

14. A gamut adjusting method of a gamut adjusting circuit, the method, comprising:
calculating, by a saturation calculating circuit of the gamut adjusting circuit, saturation of an input image signal;

executing, a matrix calculating circuit of the gamut adjusting circuit, a matrix calculation based on a translation matrix to convert an input image signal into an image signal for display; and generating, by data translation circuit of the gamut adjusting circuit, an output image signal for output on a display based on the matrix calculation, the matrix calculation including:

setting, by a matrix calculating circuit of the gamut adjusting circuit, a translation matrix such that a tone on a display corresponds to or approximates a tone of the input image signal, when a value of the saturation is smaller than a threshold value, and switching, by a matrix calculating circuit of the gamut adjusting circuit, the translation matrix when a value of the saturation is greater than the threshold value and smaller than a maximum value of saturation, the translation matrix switched as the saturation increases such that a vector on a xy chromaticity diagram toward a tone on a display approximates to a vector toward a tone for maximum saturation.

15. The method as claimed in claim 14, wherein the matrix calculation is executed with respect to a brightness signal of each of a plurality of primary colors of the input image signal.

16. The method as claimed in claim 14, further comprising:

defining a virtual gamut corresponding to a start translation matrix (MSTART) and an end translation matrix (MEND) for each of a plurality of divided hue areas, wherein the virtual gamut is defined such that a complementary color in one of the hue areas uses a tone defined as a same chromaticity coordinate as the MSTART and MEND and an adjacent one of the hue areas uses a same complementary tone.

17. The method as claimed in claim 16, wherein the divided hue areas correspond to a hue area divided by a predetermined angle.

18. The method as claimed in claim 17, wherein the predetermined angle is 60°.

19. The method as claimed in claim 14, further comprising:

adjusting the threshold value to prevent clipping.

20. The method as claimed in claim 14, wherein a tone on the display corresponds to or approximates a tone of the input image signal when a value of the saturation is smaller than the threshold value.

* * * * *